US009151637B2

(12) United States Patent
Canale et al.

(10) Patent No.: US 9,151,637 B2
(45) Date of Patent: Oct. 6, 2015

(54) METHOD OF APPROACHING A PLATFORM

(71) Applicant: AIRBUS HELICOPTERS, Marignane, Cedex (FR)

(72) Inventors: Nicolas Canale, Marseilles (FR); Lionel Iraudo, Saint Cannat (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 14/294,463

(22) Filed: Jun. 3, 2014

(65) Prior Publication Data

US 2014/0365044 A1 Dec. 11, 2014

(30) Foreign Application Priority Data

Jun. 5, 2013 (FR) ...................................... 13 01272

(51) Int. Cl.
| | |
|---|---|
| *G05D 1/00* | (2006.01) |
| *G01S 13/93* | (2006.01) |
| *G08G 5/00* | (2006.01) |
| *G01C 21/00* | (2006.01) |
| *G01C 23/00* | (2006.01) |
| *G05D 1/06* | (2006.01) |
| *G08G 5/02* | (2006.01) |
| *G01C 21/20* | (2006.01) |

(52) U.S. Cl.
CPC .............. *G01C 23/005* (2013.01); *G01C 21/20* (2013.01); *G01S 13/9303* (2013.01); *G05D 1/0676* (2013.01); *G08G 5/02* (2013.01)

(58) Field of Classification Search
USPC .............. 701/16; 244/75.1, 183; 340/951, 963
See application file for complete search history.

(56) References Cited

U.S. PATENT DOCUMENTS

| | | | | |
|---|---|---|---|---|
| 4,106,731 A | * | 8/1978 | Bliss | 244/188 |
| 4,316,252 A | * | 2/1982 | Cooper | 701/16 |
| 5,343,395 A | * | 8/1994 | Watts | 701/16 |
| 5,377,937 A | * | 1/1995 | LaMay et al. | 244/185 |
| 7,016,772 B2 | | 3/2006 | Yanagi | |

(Continued)

FOREIGN PATENT DOCUMENTS

| | | |
|---|---|---|
| EP | 2249126 A2 | 11/2010 |
| EP | 2249126 A3 | 12/2010 |

(Continued)

OTHER PUBLICATIONS

French Search Report for FR 1301272, Completed by the French Patent Office on Feb. 25, 2014, 8 Pages.

(Continued)

*Primary Examiner* — Yonel Beaulieu
(74) *Attorney, Agent, or Firm* — Brooks Kushman P.C.

(57) ABSTRACT

A method having a preparation stage for preparing an approach path (25) to a theoretical position (20') of a platform (20). During a consolidation stage, a current position (20") of said platform (20) is determined and an alert is triggered when the distance (D1) between said theoretical position (20') and said current position (20") is greater than a first threshold. During a security stage, entities provided with respective automatic identification systems and present in a predetermined monitoring zone (OCZ) are monitored, and a horizontal representation of said approach path (25) is displayed on a display screen (8) together with the following for each entity: a plot (41) representing its current position; an indication (42) of the travel direction of the entity; and a representation (43) relating to the danger level of the entity.

13 Claims, 3 Drawing Sheets

(56) References Cited

U.S. PATENT DOCUMENTS

| | | | |
|---|---|---|---|
| 8,296,001 | B1 | 10/2012 | Kabel et al. |
| 8,352,102 | B2 | 1/2013 | Deker et al. |
| 2004/0044446 | A1* | 3/2004 | Staggs .................... 701/16 |
| 2010/0168939 | A1 | 7/2010 | Doeppner et al. |
| 2011/0066307 | A1* | 3/2011 | Hiebl ...................... 701/16 |
| 2014/0244079 | A1 | 8/2014 | Iraudo et al. |

FOREIGN PATENT DOCUMENTS

| | | |
|---|---|---|
| FR | 2943778 | 10/2010 |
| FR | 3002675 A1 | 8/2014 |
| GB | 2492665 | 1/2013 |
| JP | 3763004 | 4/2006 |
| WO | 2010077531 A2 | 7/2010 |
| WO | 2010077531 A3 | 7/2010 |

OTHER PUBLICATIONS

U.S. Department of Transportation Federal Aviation Administration, Advisory Circular No. 90-80B, Apr. 12, 1999, XP 055097872, 58 Pages, "Approval of Offshore Standard Approach Procedures, Airborne Radar Approaches, and Helicopter En Route Descent Areas."

JAR OPS 3, Joint Aviation Authorities Amendment 3, Dated Apr. 1, 2004, Amendment 2 Published Jan. 1, 2002, 356 Pages, "Joint Aviation Requirements: Commercial Air Transportation (Helicopters)."

Official Journal of the European Union Oct. 25, 2012, Commission Regulation (EU) No. 965/2012 of Oct. 5, 2012, 148 Pages, "Laying down technical requirements and administrative procedures related to air operations pursuant to Regulation (EC) No. 216/2008 of the European Parliament and of Council."

Safety Regulation Group, Civil Aviation Authority, CAA Paper No. 2010/01, Published May 2010, 96 Pages, "The SBAS Offshore Approach Procedure (SOAP)."

Esterline CMC Electronics Operational Program, CMA-9000, Operational Program S/W 169-614876-022, Aug. 21, 2008, 1246 Pages, "Operator's Manual Flight Management System."

McFarlane., Second GIANT User Forum, Brussels, Oct. 9, 2008, 9 Pages, "A New Procedure for North Sea Helicopter Operations."

Dodson et al. Paper presented at the 23rd European Rotocraft Forum, Dresden, Germany, Sep. 1997, p. 61.1-61.14, "A North Sea Trial to Investigate the use of Differential GPS for Instrument Approaches to Offshore Platforms."

European Search Report for European application No. 14001499.4, Completed by the European Patent Office, Dated Oct. 13, 2014, 10 Pages.

European Search Report for European application No. 14001498, Completed by the European Patent Office on Oct. 2, 2014, 8 Pages.

* cited by examiner

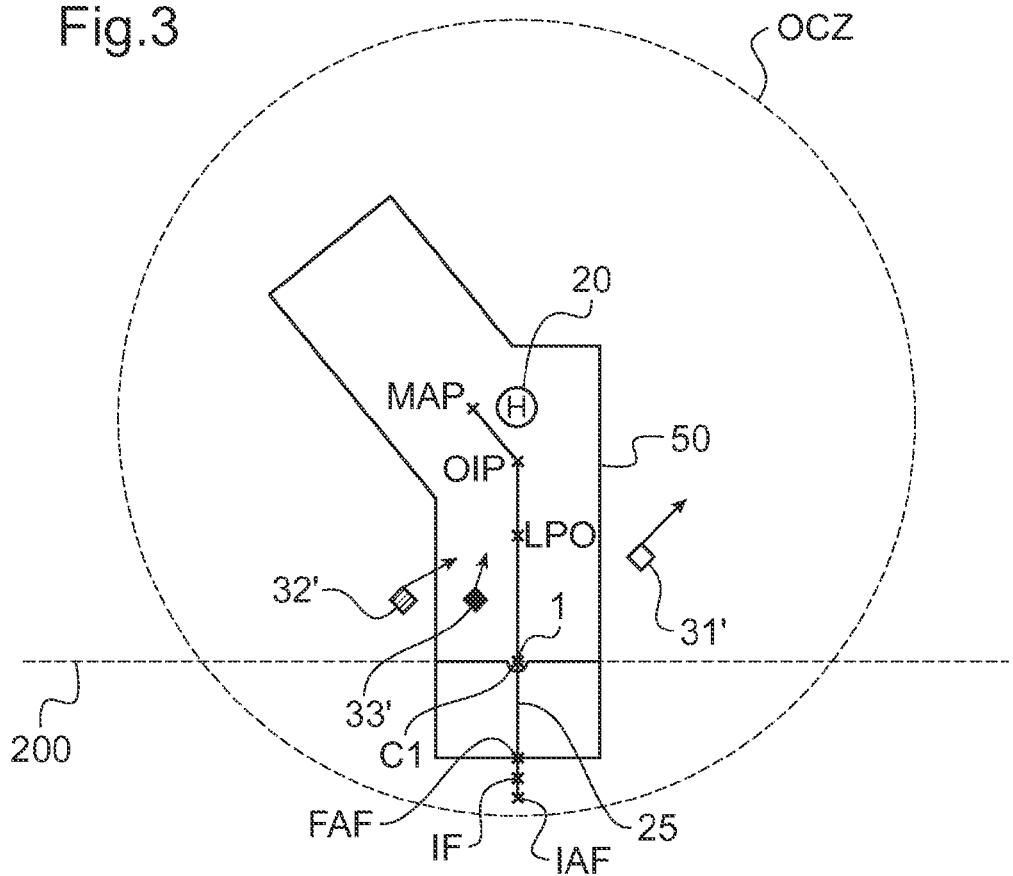
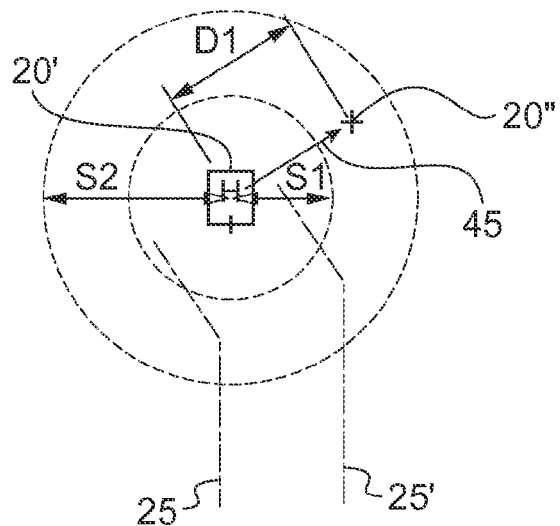

METHOD OF APPROACHING A PLATFORM

CROSS REFERENCE TO RELATED APPLICATIONS

This application claims priority to French patent application No. FR 13 01272 filed on Jun. 5, 2013, the disclosure of which is incorporated in its entirety by reference herein. This application is also related to a U.S. application Ser. No. 14/29, 439 entitled "A Method Of Approaching A Platform" filed on today's date which also contains priority to French patent application No. FR 13 01272.

BACKGROUND OF THE INVENTION (1) Field of the Invention

The present invention relates to a method of guiding an aircraft to a platform, and in particular a short-landing aircraft such as an aircraft having a rotary wing, for example.

The invention thus lies in the technical field of systems for assisting the piloting of an aircraft, and in particular automatic systems for providing rotorcraft with assistance in approaching platforms.

(2) Description of Related Art

A rotary wing aircraft must be capable of finding and approaching platforms and moving vessels in complete safety, independently of weather conditions and of visibility, and while avoiding any obstacles present in the approach zone.

The approach is carried out when taking account of the direction and the speed of the wind in the sector, of the type of platform being approached (stationary platforms, movable platforms, ships, or barges) of nearby obstacles (cranes, barges, platform-positioning boats, container ships, or super tankers sailing around the approach zone, or other nearby platforms), and of passenger comfort.

A platform approach is generally made up of the following flight segments.

An approach thus has an arrival segment connecting the last flight point of the current stage of flight with an initial approach point known as the initial approach fix (IAF). This arrival segment is generally positioned at an altitude of 1500 feet (ft), it being understood that a foot is a unit of length equal to 30.48 centimeters (cm).

An initial approach segment may connect the initial approach fix IAF to an intermediate point referred to as an intermediate fix (IF). This initial approach segment seeks to enable the aircraft to decelerate and to become aligned with the path that is to be followed.

An intermediate approach segment may connect the intermediate fix IF to a final approach point known as a final approach fix (FAF) to descend to an altitude of up to 1000 ft. The purpose of this segment is to bring the aircraft into alignment, to decelerate it, and to prepare for the final approach segment.

At least one final approach segment connects the final approach fix FAF to a decision point known as the missed approach point (MAP).

By way of example, the final approach fix FAF is connected to the missed approach point MAP by passing via a leveling-off point LPO and an offset instrument point OIP.

If a pilot establishes visual contact with the platform at the decision point, the pilot can land the aircraft on the platform.

In contrast, an overshoot segment should be followed if visual contact with the platform is not achieved at this stage of the approach. This overshoot segment may also be followed at any time during the approach if the crew judges that to be appropriate. The purpose of this overshoot segment is to return to a safe altitude.

The final descent going from the final approach fix to the decision missed approach point MAP should be followed only in the absence of any obstacle in a corridor of 2 nautical miles (NM), where a nautical mile is a length of 1852 meters (m).

If obstacles are present in the corridor, then the approach procedure should be canceled on safety grounds. Detecting such obstacles can be difficult. The crew may have difficulty in evaluating whether the presence of a moving ship is such as to make it necessary to abort the approach procedure.

The following documents present known platform approach procedures:

the Document AC90-80B "Approval of off-shore standard approach procedures, airborne radar approaches, and helicopter en-route descent areas", published Apr. 12, 1999;

the Document JAR OPS 3, Section 2, Subpart E IEM to Appendix 1 to JAR-OPS 3.430 subparagraph (d) (amendment 2, published Jan. 1, 2002);

the Document EU-OPS Commission Regulation (EU) No. 965/2012 of Oct. 5, 2012 (AMC1 CAT.OP MPA.120 and GM1 CAT.OP.MPA.120); and the Document CAA paper 2010/01 "The SBAS off-shore approach procedure (SOAP")".

When weather conditions are unfavorable, an instrument approach is beneficial in terms of relieving the crew of stress, where the crew must pilot the aircraft manually in order to guide it to a zone where it is possible to obtain visual acquisition of the platform.

In the transition between a stage of flying by instruments and a stage of flying visually, the crew's attention needs to switch continuously between the display on the piloting screens of the instrument panel, and what can be seen outside in order to detect any visible sign or indication suitable for confirming the position of the platform (light, terrain). This way of approaching a platform is thus not entirely practical and can sometimes lead to errors of interpretation, e.g. in the event of fog leading to temporary loss of acquisition of the landing target.

Until now, instrument approaches to a platform or to a moving ship have been carried out without using a navigation computer, also known as a flight management system (FMS), and without coupling the autopilot of the aircraft on an approach path as predefined by the flight management system FMS.

Nowadays certain platforms are fitted with a device known as a non-directional beacon (NDB) that is used by the crew via the navigation computer as means for assisting navigation and for correlating the position of the aircraft with relative accuracy, but those means do not enable an approach flight plan to be prepared.

A navigation computer is known that is used to provide horizontal guidance while en route. For the approach stage, the crew determines an off-route target point corresponding to the coordinates of the platform to be reached as means for assisting in navigation. Nevertheless, the navigation computer does not segment the various stages of the approach to the platform so as to servo-control the autopilot on such guidance data (horizontal deflection, vertical deflection, speed setpoint).

The approach is then carried out manually or semi-manually with assistance from certain higher modes of the autopilot by using approach charts as published by the operators and as approved by the local authorities.

The weather radar of the aircraft may also be used as means for identifying the platform, and for detecting and avoiding any transient or stationary obstacle while approaching and during the final descent.

Document US 2010/0168939 proposes a module and an automated method of approaching a platform on an approach path constructed on the basis of approach points.

According to that Document US 2010/0168939, the pilot inputs into a module of the aircraft:

the coordinates of the target platform to be reached;
the final approach heading towards the platform;
an offset distance laterally separating the path to be followed from a path directed towards the platform along said approach heading; and
a descent height.

Under such circumstances, the module of the aircraft determines in particular the position of the initial approach fix IAF and of the final approach fix FAF in response to the data that has been input. The aircraft is then directed towards the initial approach fix.

In this way, the approach path as prepared includes a horizontal segment connecting the initial approach fix IAF to a final approach fix FAF.

Thereafter, the path has a descent segment followed by a level segment in order to connect the final approach fix FAF with a missed approach decision point MAP.

The initial approach fix IAF, the final approach fix FAF, and the missed approach decision point MAP are contained in a vertical plane parallel to the selected approach heading. It can be understood that the term "vertical plane" is used to designate a plane extending in the gravity direction with points in this vertical plane lying at various altitudes.

This vertical plane is offset relative to the platform by a distance equal to the input offset distance.

Document U.S. Pat. No. 7,016,772 B2 discloses a device for displaying information on vehicles as a function of the importance of the information (size, position, speed), and it discloses a system for a ship that combines radar information with information coming from an automatic identification system (AIS).

Document U.S. Pat. No. 8,296,001 B1 discloses a system for assisting a navigator by providing the characteristics of other vessels and by providing coastal information. A radar or an automatic identification system AIS may be used.

Document JP 3 763 004 B1 describes a system for protecting a descent plane for aircraft approaching an airport relative to ships with the help of an AIS.

The technological background also includes the following documents:

Esterline CMC Electronics, CMA-9000 flight management system operator's manual, operational program S/W 169-614873-022, publication No. 9000-GEN-0105, itel N), 930-6000088-00, Aug. 21, 2008;

N. McFarlane, "A new procedure for North Sea helicopter operations", Second GIANT Use Forum, Brussels, Belgium, Oct. 9, 2008;

K. M. Dodson and J. R. A. Stevens, "A North Sea trial to investigate the use of differential GPS for instrument approaches to off-shore platforms", paper presented at the 23$^{rd}$ European Rotorcraft Forum, Dresden, Germany, September 1997; and Documents EP 2 249 126, GB 2 492 665, FR 2 943 778.

BRIEF SUMMARY OF THE INVENTION

An object of the present invention is thus to propose an approach method seeking to assist a crew in landing an aircraft on a platform.

The invention provides a method of facilitating the approach of an aircraft to a platform present on a liquid surface, the method comprising a preparation stage for preparing an approach path to a theoretical position of said platform.

Furthermore, the method may include a consolidation stage, or a security stage, or both a consolidation stage and a security stage.

During the consolidation stage of consolidating said approach path, the following steps are performed:

determining the current position of said platform;
determining a distance between said theoretical position and said current position; and
triggering an alert when said distance is greater than a first threshold.

During the security stage of making said approach path safe, the following steps are performed:

determining over time the current positions and also the travel directions and the travel speeds of entities provided with respective automatic identification systems and present in a predetermined monitoring zone;

determining a danger level for each entity relative to the approach path being followed; and displaying a horizontal representation of said approach path on a display screen together with the following for each entity: a plot representing the current position of the entity; an indication of the travel direction of the entity; and a representation relating to the danger level of the entity.

The monitored entities may be floating entities and/or flying entities.

The preparation stage may be undertaken automatically by a navigation computer, on the basis of input data including in particular the theoretical position of the platform and an approach course, such as a heading to be followed, for example. Reference may be made to the literature about the approach procedures that can be generated.

The theoretical position may be input by an operator, or it may come from a platform database. By way of example, the database may have an identifier of the platform associated with its coordinates. Other information may also be present, such as in particular the radius of each platform, assuming that each platform is contained in a circle.

The consolidation stage proposes comparing the theoretical position of a target platform that has been used for establishing the approach path with a current position of that target platform. Thus, a radar signal or indeed a signal known as an AIS signal (i.e. a signal for use in an automatic identification system) serves to obtain a "measured" current position of the target platform.

If the distance between the theoretical position and the current position is less than a first threshold, it is assumed that the coordinates of the theoretical position are accurate. The first threshold may be of the order of 0.1 NM.

In contrast, if the threshold is exceeded, an alarm is generated to warn the crew and indicate that there might be a problem. It is explained below that the crew can then either divert or else reset the approach path on a new position of the platform, e.g. its current position.

It can be understood that the aircraft takes measurements at a given frequency. For example, during forward flight, the aircraft may observe the positions transmitted by the automatic identification systems once every six seconds.

Under such circumstances, an alert may be generated only if a plurality of measurements confirm the offset present between the theoretical position and the measured current position.

The consolidation stage may be performed automatically in real time by a computer, such as a digital map (DMAP) in communication with the navigation computer.

Advantageously this consolidation stage enables the approach to be made safe.

Furthermore, the method may implement a security stage. Certain regulations require the aircraft to follow an approach path that is present in an approach corridor having a width of 2 NM centered on the approach path, which approach corridor should not contain any obstacles.

It can be difficult to verify this requirement while flying on instruments under atmospheric conditions that are difficult and while making use solely of the weather radar as primary means for identifying and detecting obstacles. The security stage tends to remedy that for obstacles that include respective automatic identification systems.

Such automatic identification systems transmit information to the aircraft about the obstacle, such as its position and its speed vector. With the help of such information, the danger of the obstacle is determined by determining any risk of conflict between the path of the aircraft and the path of the obstacle. By way of example, this operation may be performed for each obstacle that is present in the monitoring zone under consideration. Under such circumstances, the approach path followed by the aircraft is displayed on a display screen, together with identifiers making it possible visually to determine the position of an obstacle, the movement being performed by that obstacle, the danger of the obstacle relative to the calculated approach path, or indeed the predicted position of the obstacle at the end of a given length of time.

With the help of this information, a member of the aircraft crew can establish an alternative approach path if there is a risk of an obstacle being present in the current approach corridor. The aircraft may also divert if that should be necessary.

This method may also include one or more of the following additional characteristics.

Thus, during the consolidation stage and if the distance between the theoretical position and the current position is less than a second threshold, it is possible to modify the theoretical platform of the platform manually. The second threshold may be greater than the first threshold.

For example, the theoretical position of the platform is modified so as to minimize the distance between it and the measured current position, possibly by making it coincide with the current position. The new theoretical position is then used to establish the approach path, e.g. by a navigation computer.

By way of example, a new theoretical position may be selected with the help of a cursor displayed on the display screen, e.g. in the form of a Saint Andrew's cross. By way of example, this cursor may point to the current position displayed on the display screen. It is also possible to input a distance and a bearing into the navigation computer in order to reset the theoretical position of the platform. Finally, it is possible to use an automatic identification system (AIS) of the platform in order to reset the theoretical position of the platform on its AIS coordinates.

It should be observed that resetting the position of the platform is authorized only if the distance that has been determined is less than the second threshold, which threshold may be about 0.3 NM, for example. This characteristic seeks to avoid hazardous resetting in the event of the difference between the theoretical position and the current position being excessive.

As a variant, it is possible to authorize resetting independently of the value of this distance.

Such resetting may lead to a new approach path being calculated automatically.

Thus, it is possible to determine automatically a vector connecting the theoretical position of the platform with a new target position, and the approach path can be offset automatically by applying this vector thereto in order to reach said new position.

The resetting may be prevented if it occurs too late in the approach procedure. The manufacturer may determine an approach point beyond which resetting is no longer possible.

Furthermore, it is possible to begin the consolidation stage as soon as information has been received giving the current position of the platform. For example, the consolidation stage may begin when the aircraft receives information coming from an automatic identification system of the platform.

Furthermore, said predetermined monitoring zone is optionally a circle of radius defined by the manufacturer and centered on the platform to be reached.

This radius may correspond to the length between an initial approach fix IAF for the target platform plus a constant, which may be of the order of 0.5 NM, for example.

In addition, it is possible to display an approach corridor on the display screen, the approach corridor having a given width centered on said approach path. The width may be 2 NM in compliance with certain regulations. The approach corridor may then be the approach corridor as described in those regulations, possibly extended locally for safety reasons.

Furthermore, the approach path may include a final approach fix FAF.

Under such circumstances, during the security stage, for an approach path passing through a final approach fix FAF and before the final approach fix FAF being reached by the aircraft, the following steps are performed:

determining the time needed for said aircraft to reach the final approach fix FAF;

determining the predicted positions of each of said entities when said aircraft reaches the final approach fix; and determining the danger level of each entity as a function of its predicted position and of its current position relative to an approach corridor of given width centered on said approach path.

By way of example, first, second, and third danger levels are used, with an entity being associated:

with the first danger level when the current position of the entity is not situated in said approach corridor and when its predicted position is not situated in said approach corridor for the time when said aircraft reaches the final approach fix;

the second danger level when the current position of the entity is not situated in said approach corridor and when its predicted position is situated in said approach corridor for the time when said aircraft reaches the final approach fix; and the third danger level when the current position of the entity is situated in said approach corridor, and when its predicted position is situated in said approach corridor for the time when said aircraft reaches the final approach fix.

If an entity presents the first, second, or third danger level, then a respective first, second, or third representation is displayed. For example, each representation corresponds to the color of the plot. A white-colored plot may indicate an entity that is not dangerous, presenting the first danger level, a shaded or amber-colored plot may indicate an entity that is potentially dangerous, presenting the second danger level, and a red- or black-colored plot may indicate an entity that is dangerous, presenting the third danger level.

Furthermore, depending on the entities that are detected, it is possible to authorize a change of course for said approach path during a stage of preparing an alternative approach path.

By way of example, in the presence of dangerous entities, an operator prepares an alternative approach path by selecting a new approach course. If the approach path presents a segment offset to the right of the platform relative to an initial segment, then the operator may also select an offset to the left of the platform, and vice versa.

It is possible to display the originally prepared approach path and the alternative approach path on the display screen with distinct representations in order to make it easier to prepare the alternative approach path.

By way of example, the current approach path may be displayed using continuous lines, and the alternative approach path may be displayed using dashed lines. The alternative approach corridor may also be displayed.

In addition, during the security stage, for the approach path passing via a final approach fix FAF, and after the final approach fix FAF has been reached, the following steps are performed:

determining over time the current positions and the predicted positions based on the travel directions and the travel speeds of entities referred to as "intruders" situated ahead of said aircraft or in a circle centered on said aircraft and presenting a predetermined diameter; and for each intruder and over time:
determining whether said intruder at a current instant is situated in an approach corridor surrounding said approach path and whether said intruder is situated ahead of the aircraft;
if said intruder is not present in the approach corridor and if said intruder is situated ahead of the aircraft, determining whether the intruder is going to enter said approach corridor in the future, and if so when said intruder is going to enter the approach corridor;
associating said intruder with a first danger level represented by a first representation on the display screen when said intruder is behind the aircraft at a current instant or when said intruder is going to be behind the aircraft when it enters into said approach corridor;
associating said intruder with a second danger level represented by a second representation on the display screen when said intruder is going to be ahead of the aircraft when it enters into said approach corridor; and
associating said intruder with a third danger level representative by a third representation on the display screen when said intruder is ahead of the aircraft in said approach corridor at the current instant.

Normally, there should be no obstacle in the approach corridor at this stage. Nevertheless, a ship or an aircraft might possibly change heading, and the method can enable a danger to be estimated that was not predicted initially.

This procedure makes it possible to quantify potential risks associated with such obstacles.

In addition, in a variant, the following steps are performed:
displaying a moving box on the display screen, the moving box representing a quadrilateral of predetermined fixed width and of length equal to the product of the ground speed of the aircraft multiplied by a time constant, the moving box being centered transversely on the speed vector of the aircraft and extending longitudinally from a representation of the aircraft;
determining over time the current positions together with the travel directions, the travel speeds, and the predicted locations at the end of said time constant of entities referred to as "near elements" that are situated on said liquid surface and that are provided with respective automatic identification systems, said entities being present in a predetermined scan zone centered on said aircraft; and for each near element displaying the following on the display screen:
a first symbology when the current position and the predicted location are not situated in the moving box;
a second symbology when the current position is not situated in the moving box and when the predicted location is situated in the moving box;
a third symbology when the current position is situated in the moving box and when the predicted location is not situated in the moving box; and
a fourth symbology when the current position and the predicted location are both situated in the moving box.

The moving box serves to provide a pilot with information about the situation to be expected in the short term.

This alert information about the potential risk of interference between the path of the aircraft and the path of the moving obstacle may take account either of the current speed of the aircraft or of the speed setpoints followed by default the aircraft along the predicted approach path.

It should be recalled that each entity is shown diagrammatically on the display screen with the help of the following visual identifiers: a plot, an indication of the travel direction of the entity, and a representation about the danger level of the entity, e.g. by coloring the plot, and possibly also an indication about a predicted position for the entity at the end of a given length of time. This indication of the travel direction may be an arrow of length that depends on the travel speed of the entity, the arrow possibly terminating at a position that is predicted for the entity at the end of a given length of time as predetermined by the manufacturer.

The above-mentioned symbologies may include identifiers of some other type, or may indeed consist in modifying at least one of the identifiers.

By way of example, the first symbology may avoid modifying any of said identifiers. In contrast, the second symbology may cause said arrow to flash, the third symbology may cause a plot to flash, and the fourth symbology may cause both the plot and the arrow representing an entity to flash.

BRIEF DESCRIPTION OF THE SEVERAL VIEWS OF THE DRAWINGS

The invention and its advantages appear in greater detail in the context of the following description of implementations given by way of illustration with reference to the accompanying figures, in which:

FIG. 3 is a diagram explaining the security stage when the aircraft has reached the final approach point;

FIG. 4 is a diagram explaining the consolidation stage;

Elements shown in more than one of the figures are given the same references in each of them.

DETAILED DESCRIPTION OF THE INVENTION

Figure 1:
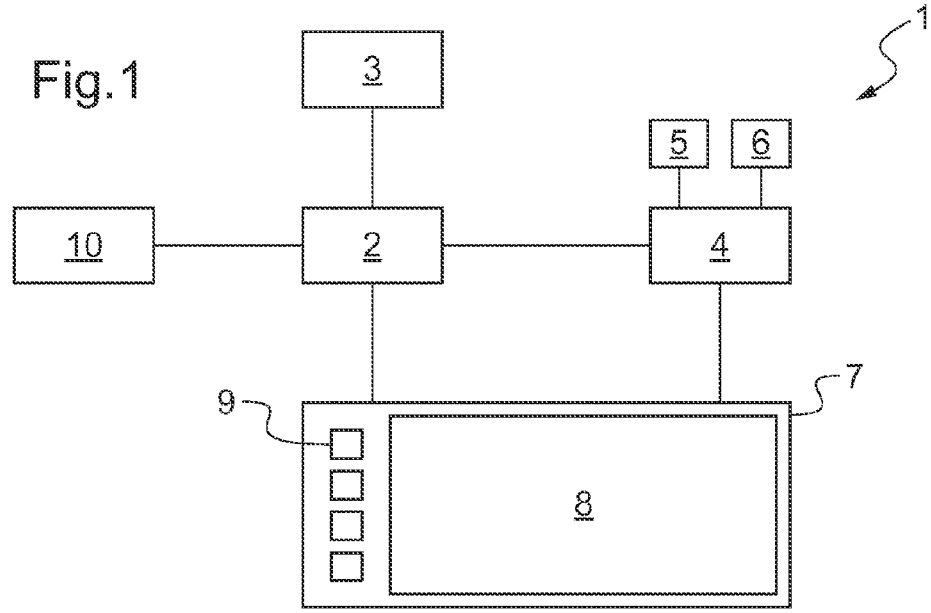
FIG. 1 is a diagram representing an aircraft performing the method of the invention.

FIG. 1 shows an aircraft 1 suitable for performing the method of the invention.

This aircraft may include a navigation computer 2 such as a computer commonly known as a flight management system (FMS).

The navigation computer 2 may communicate with a database 3 listing platforms and certain characteristics of the platforms.

Furthermore, the navigation computer is in communication with an automatic guide device 10 suitable for guiding the aircraft along an approach path prepared by the navigation computer.

The navigation computer may generate an approach path so as to reach a target and in particular a platform floating on a liquid surface, and it may transmit instructions to the automatic guide device so that the aircraft is guided along the approach path.

Furthermore, the aircraft 1 is provided with a mapping computer, such as a computer known as a digital map (DMAP).

The mapping computer 4 is connected to an automatic identification system (AIS) 5. The automatic identification system 5 may receive AIS signals coming from entities fitted with similar systems. These AIS signals may provide the current latitude and longitude of an entity, its travel speed, its travel direction, its height, its draft, . . . .

The mapping computer 4 may be connected to an automatic identification system 5 known as a traffic collision avoidance system (TCAS). The automatic identification system may receive TCAS signals coming from other aircraft fitted with similar systems. These TCAS signals may provide the distance between the aircraft and the intruding aircraft, and also the following information relating to the introducing aircraft: altitude, vertical speed, relative course, current latitude and longitude, and travel speed.

It can be understood that the aircraft may include an automatic identification system 5 making use of AIS technology and/or of TCAS technology, in particular.

Furthermore, the mapping computer 4 may communicate with radar system 6 so as to receive echoes coming from radars and usually referred to as "radar echoes".

The mapping computer 4 is capable of managing displays that serve in particular to present the received radar echoes and the entities identified by the automatic identification system 5.

The navigation computer 2 and the mapping computer 4 are in communication with a display device 7. The display device is provided with a display screen and with buttons 9 or the equivalent that are operable by an operator. With the help of these buttons 9, an operator can send instructions or information to the navigation computer 2 and to the mapping computer 4.

Other architectures may be envisaged. For example, the automatic identification systems may be interfaced directly with the navigation computer 2, or indeed with the display device 7.

Figure 2:
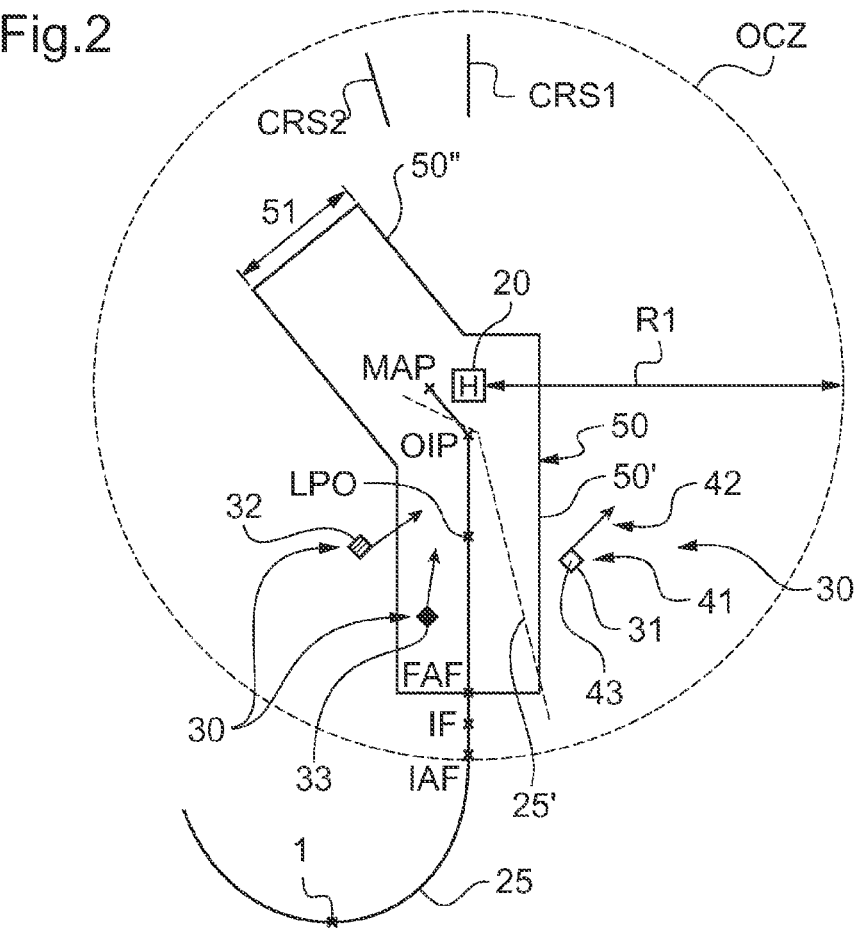
FIG. 2 is a diagram explaining the security stage when the aircraft has not reached the final approach point.

With reference to FIG. 2, and during a preparation stage, an operator operates the buttons 9 to enable the navigation computer to prepare an approach path 25.

For example, the operator selects the target platform to be reached from among the platforms stored in the database 3, a course CRS1 to follow in order to reach the target platform 20, a height magnitude relating to a minimum decision altitude for a final approach descent towards said target platform, such as a minimum descent altitude (MDA) to be reached for leveling off after the final descent stage, and an offset side to determine where the platform 20 should be found relative to the aircraft at a decision point MAP.

The navigation computer then prepares an approach path 25 that is to be followed in order to reach the target platform as a function of attributes of the platform present in the database 3 and information concerning settings. This approach path 25 is displayed on the display screen in addition to the information that is displayed as a result of instructions from the mapping computer.

The approach path may include in particular an initial approach fix IAF, a final approach fix FAF, an offset instrument point OIP, and a decision point MAP as a function of said information and of said attributes.

An intermediate approach fix IF and a leveling-off point LPO may optionally also be determined.

The initial approach fix IAF, the final approach fix FAF, the offset instrument point OIP, the coordinates of the target platform, and where applicable the intermediate fix IF and the leveling-off point LPO are all arranged in the same vertical plane. This vertical plane extends along the set course CRS1.

In contrast, the decision point MAP is offset from the vertical plane. It should be recalled that whether the offset of the decision point is to the left or the right of the vertical plane may optionally be a setting.

Figure 6:
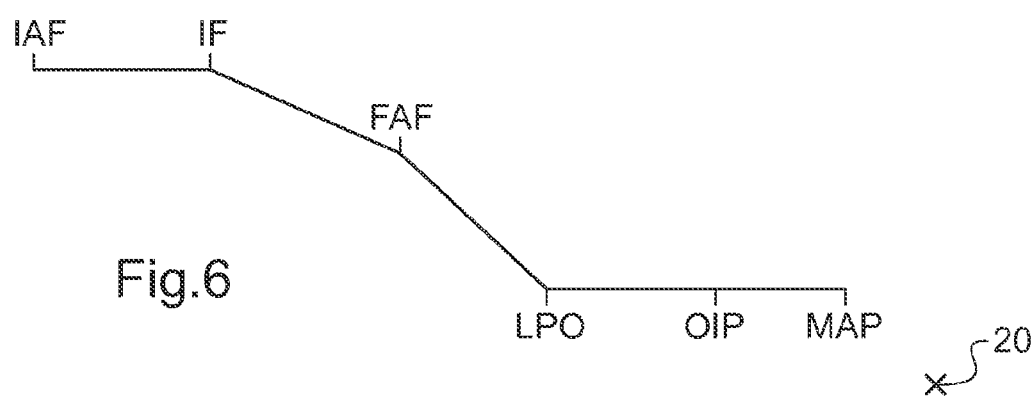
FIG. 6 is a vertical representation of the path followed.

In FIG. 6, the decision point MAP, the offset instrument point OIP, and where applicable the leveling-off point LPO, are all arranged at an altitude that is equal to the minimum decision altitude MDA.

It can be understood that the invention nevertheless applies to other types of approach path.

With reference to FIG. 4, the mapping computer may then perform a consolidation stage.

Thus, the current position 20" of the platform 20 is determined, e.g. with the help of the mapping computer 4.

For example, the mapping computer 4 uses signals coming from the automatic identification system 5 or from the radar system 6.

This step may be performed at a predetermined location relative to the theoretical position 20' of the target platform, or indeed as soon as information is received providing the current position 20", such as an AIS signal coming from the platform 20.

Under such circumstances, the distance D1 between the theoretical position 20' and the current position 20" is determined, and a visual and/or audible alert is triggered when the distance D1 is greater than a first threshold S1. These steps may be carried out by the mapping computer, the alert being generated by the display device 7, for example.

If the distance D1 is less than a second threshold S2, then the position of the platform 20 may be modified manually.

For example, an operator uses a button 9 to point to a geometrical location on the display screen in order to inform the navigation computer of the new position to be taken into account for the platform.

In the method, a vector 45 is determined automatically connecting the theoretical position 20' with the new position 20". Under such circumstances, the approach path 25 is automatically offset by applying said vector 45 thereto in order to define a new approach path 25'. For example, the mapping computer sends the new theoretical position to the navigation computer, which calculates the vector to be applied, and which thus prepares the new path.

With reference to FIG. 2, a horizontal representation of the approach path to be followed is displayed on the display screen. It should be observed that it is also possible to display an alternative approach path 25' that is being prepared. Two distinct paths are shown in different manners in order to make them easier to view.

The display screen 8 may also display a vertical representation of the type shown in FIG. 6.

By way of example and with reference to FIG. 2, it may be observed that the mapping computer can also request that an approach corridor 50 of given width 51 be displayed. The approach corridor 50 is centered on the approach path 25 that is to be followed. The approach corridor may correspond to the corridor defined by certification regulations.

For safety purposes, the approach corridor may possibly have dimensions that are greater than the dimensions required by regulations, at least locally. For example, the approach corridor may comprise a straight line segment 50' from the final approach fix FAF to the offset instrument point OIP, followed by a slopping segment 50" from the offset instrument point OIP. Nevertheless, the straight line segment 50' may also be extended beyond the offset instrument point OIP.

In addition, or alternatively, a security stage is performed on the approach path 25.

Under such circumstances, the current positions and the travel directions and the travel speeds of certain entities 30 situated on the liquid surface or in the air are determined at a sampling frequency. More precisely, the mapping computer 4 co-operates with the automatic identification system 5 to list the entities 30 having AIS, TCAS automatic identification systems that are present in a predetermined monitoring zone OCZ.

The monitoring zone OCZ shown in FIG. 2 is a circle of radius R1 centered on the platform 20 that is to be reached.

Under such circumstances, a danger level is determined for each entity relative to the approach path being followed in application of rules defined by the manufacturer.

Thereafter, there are displayed on the display screen 8: the horizontal representation of the approach path 25 together with the following for each entity: a plot 41 representing the actual position of the entity, an indication 42 of the travel direction of the entity, and a representation 43 concerning the danger level of the entity. The indication 42 may be an arrow pointing along the speed vector of the entity and having a length that depends on the forward speed of the entity. This length may also take into consideration a given time, such that the arrow may indicate the predicted position of the entity at the end of this given time.

The danger level may be established by the mapping computer, which communicates the data to be displayed together with the corresponding symbology to the display device 7, while possibly also generating an audible alert, depending on the danger.

The manufacturer may establish three danger levels that are displayed by coloring the plots 41. A first danger level may lead to a first type of coloring, e.g. represented by a white color on the plot 31 in FIG. 2. A second danger level may give rise to a second type of color as represented by shading on the plot 32 in FIG. 2. Finally, a third danger level may give rise to a third type of color represented by the color black on the plot 33 in FIG. 2. On an aircraft and by way of example, the second type of color may be an amber color and the third type of color may be a red color.

As a function of the danger of the entities taken into account consideration, it may be appropriate to prepare an alternative approach path 25' that seeks to avoid entities that are judged to be dangerous. Thus, a change of heading may be authorized to go from an approach path in alignment with a first course CRS1 towards an alternative approach path in alignment with a second course CRS2.

During the security stage, two distinct situations need to be distinguished as a function of the position of the aircraft relative to the final approach fix FAF.

Before final approach fix FAF is reached, a time TFAF is determined at the end of which the aircraft is going to reach the final approach fix FAF. This step may be performed by the mapping computer, for example. For this purpose, the mapping computer may be connected to devices for determining the ground speed of the aircraft.

Under such circumstances, the mapping computer determines the predicted position of each entity under study at the end of this time TFAF. The aircraft thus determines where the entities will be when the aircraft reaches the final approach fix as a function of information that is transmitted by their respective automatic identification systems.

Under such circumstances, the danger level of each entity is established as a function of its predicted position and as a function of its current position relative to the approach corridor.

The mapping computer may thus confer a first danger level to an entity when the current position of this entity does not lie in the approach corridor 50 and when its predicted position does not lie in the approach corridor 50 at time TFAF. The entity marked by the plot 31 thus shows this first danger level.

The second danger level corresponds to an entity having a current position outside the approach corridor 50, but having a predicted position that lies within the approach corridor 50. The entity marked by the plot 32 thus presents this second danger level.

Finally, the third danger level is associated with an entity when its current position and its predicted position are both situated in the approach corridor 50. The plot 33 corresponds to the current position of such an entity.

With reference to FIG. 3, the system focuses on entities that are potentially situated ahead of the aircraft once the final approach fix FAF has been reached or passed, i.e. entities situated between the line 200 and the top of the sheet on which FIG. 3 is marked.

Consequently, as time passes, the system keeps track of the current positions and also the travel directions and the travel speeds of entities referred to for convenience as "intruders" that are situated either ahead of the aircraft 1, or else in a circle C1 centered on the aircraft 1. The diameter of the circle is small and less than the width of an approach corridor.

For each intruder and as time passes, the system operates at a processing frequency to determine whether the intruder at a current instant is situated in the approach corridor 50 and whether the intruder is situated ahead of the aircraft 1. If the intruder is not present in the approach corridor 50 and if the intruder is situated ahead of the aircraft 1, it is determined whether the intruder is going to enter into the approach corridor 50 in the figure, and if so, when the intruder is going to enter into the approach corridor 50.

These steps may be carried out by the mapping computer.

Under such circumstances, the first danger level represented by a first representation 31' on the display screen 8 is given to an intruder when the intruder is behind the aircraft 1 at a current instant, or when the intruder is going to be behind the aircraft once it enters into the approach corridor 50, or indeed when the intruder is never going to enter into the approach corridor.

In contrast, the intruder is associated with the second danger level represented by a second representation 32' on the display screen 8 when the intruder is going to be ahead of the aircraft 1 at the time it enters the approach corridor 50.

Finally, the intruder is associated with a third danger level represented by a third representation 33' on the display screen 8 when the intruder is ahead of the aircraft 1 in the approach corridor 50 at the current instant.

Figure 5:
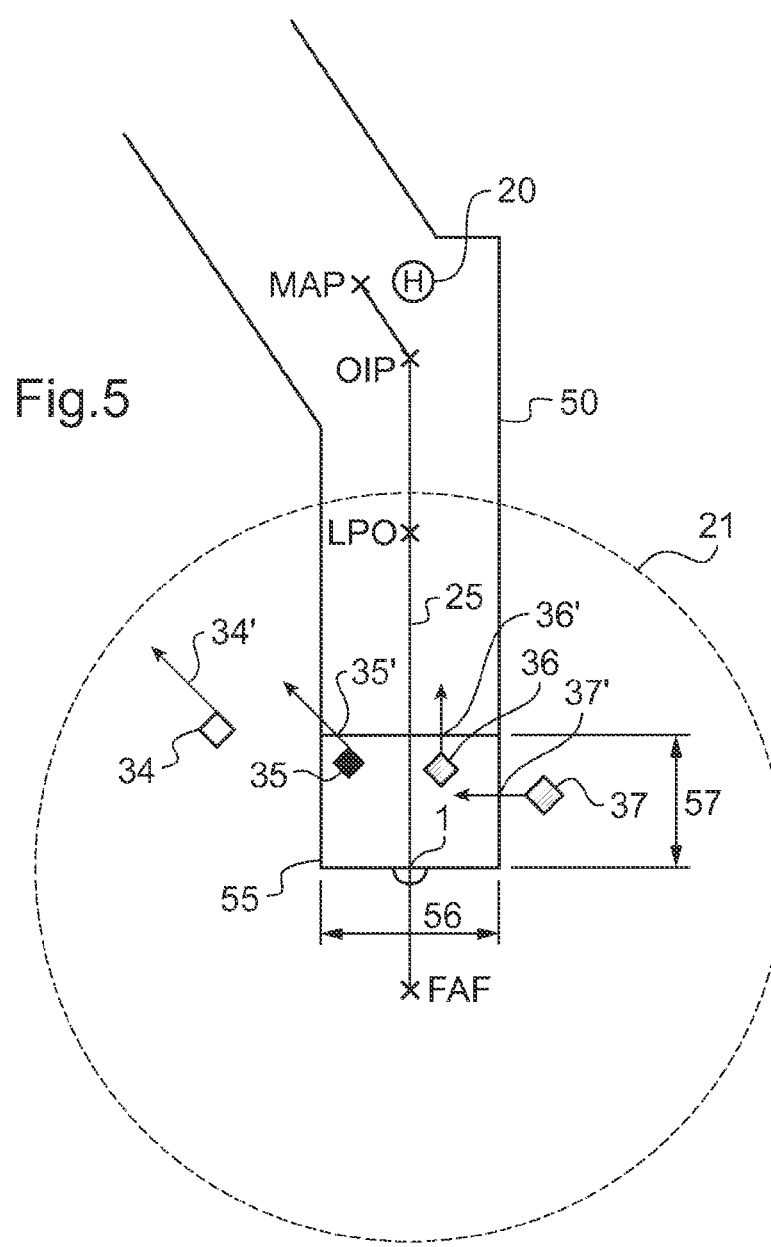
FIG. 5 is a diagram showing the displayed moving box.

Furthermore, and with reference to FIG. 5, a moving box 55 may be displayed on request on the display screen 8. This moving box corresponds on the horizontal representation to a quadrilateral of predetermined fixed width 56 and of length 57 equal to the product of multiplying the ground speed GS of the aircraft 1 by a time constant CTE. By way of example, the time constant may be selected from a list predetermined by the manufacturer.

The moving box 55 is centered transversely on the speed vector of the aircraft and it extends longitudinally along the speed vector from a representation of the aircraft 1. The moving box thus moves together with the representation of the aircraft on the display screen.

When this option is activated, additional symbology is associated with certain entities. More particularly, the system determines over time the current positions and also the travel directions, the travel speeds, and the predicted locations at the end of said time constant for entities referred to as "near elements" that are provided with respective automatic identification systems and that are present in a predetermined scan zone Z1 centered on the aircraft.

For each near element, the following are displayed:
a first symbology when the current position and the predicted location are not situated in the moving box 55;
a second symbology when the current position is not situated in the moving box 55 and when the predicted location is situated in the moving box 55;
a third symbology when the current position is situated in the moving box 55 and when the predicted location is not situated in the moving box 55; and
a fourth symbology when the current position and the predicted location are both situated in the moving box 55.

Thus, the plot 34 and the associated arrow 34' remain unchanged in the first symbology.

In contrast, the arrow 37' associated with the plot 37 may flash in the second symbology.

Furthermore, the plot 35 may flash in the third symbology, while both the arrow 36' and the plot 36 flash in the fourth symbology.

The frame of the moving box may also present a particular feature when the plot presenting the current position of an entity is present within the moving box. For example, the frame may become red.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of facilitating the approach of an aircraft to a platform present on a liquid surface, the method comprising:
   a preparation stage for preparing an approach path to a theoretical position of said platform; and
   a security stage of making said approach path safe, during which the following steps are performed:
   determining over time the current positions and also the travel directions and the travel speeds of entities provided with respective automatic identification systems and present in a predetermined monitoring zone;
   determining a danger level for each entity relative to the approach path being followed; and
   displaying a horizontal representation of said approach path on a display screen together with the following for each entity: a plot representing the current position of the entity; an indication of the travel direction of the entity; and a representation relating to the danger level of the entity.

2. A method according to claim 1, wherein during a consolidation stage of consolidating said approach path, the method comprises:
   determining the current position of said platform;
   determining a distance between said theoretical position and said current position; and
   triggering an alert when said distance is greater than a first threshold.

3. A method according to claim 2, wherein during the consolidation stage and if said distance is less than a second threshold, the theoretical position of the platform is modified manually.

4. A method according to claim 2, wherein a vector is determined automatically connecting the theoretical position of the platform to a new target position, and said approach path is offset automatically by applying said vector thereto in order to reach said new position.

5. A method according to claim 2, wherein the consolidation stage is begun as soon as information is received giving the current position of the platform.

6. A method according to claim 2, wherein said predetermined monitoring zone is a circle of radius defined by the manufacturer and centered on the platform to be reached.

7. A method according to claim 2, wherein an approach corridor is displayed on said display screen, the approach corridor having a given width centered on said approach path.

8. A method according to claim 1, wherein during the security stage, for an approach path passing through a final approach fix and before the final approach fix being reached by the aircraft, the following steps are performed:
   determining the time needed for said aircraft to reach the final approach fix;
   determining the predicted positions of each of said entities when said aircraft reaches the final approach fix; and
   determining the danger level of each entity as a function of its predicted position and of its current position relative to an approach corridor of given width centered on said approach path.

9. A method according to claim 8, wherein first, second, and third danger levels are used, an entity being associated:
   with the first danger level when the current position of the entity is not situated in said approach corridor and when its predicted position is not situated in said approach corridor for the time when said aircraft reaches the final approach fix;
   the second danger level when the current position of the entity is not situated in said approach corridor and when its predicted position is situated in said approach corridor for the time when said aircraft reaches the final approach fix; and
   the third danger level when the current position of the entity is situated in said approach corridor, and when its predicted position is situated in said approach corridor for the time when said aircraft reaches the final approach fix.

10. A method according to claim 1, wherein a change of course for said approach path is authorized during a stage of preparing an alternative approach path.

11. A method according to claim 10, wherein the originally prepared approach path and the alternative approach path are displayed on the display screen with distinct representations.

12. A method according to claim 1, wherein during the security stage, for the approach path passing via a final approach fix, and after the final approach fix has been reached, the following steps are performed:

determining over time the current positions and the travel directions and the travel speeds of entities referred to as "intruders" situated ahead of said aircraft or in a circle centered on said aircraft and presenting a predetermined diameter; and for each intruder and over time:

determining whether said intruder at a current instant is situated in an approach corridor surrounding said approach path and whether said intruder is situated ahead of the aircraft;

if said intruder is not present in the approach corridor and if said intruder is situated ahead of the aircraft, determining whether the intruder is going to enter said approach corridor in the future, and if so when said intruder is going to enter the approach corridor;

associating said intruder with a first danger level represented by a first representation on the display screen when said intruder is behind the aircraft at a current instant or when said intruder is going to be behind the aircraft when it enters into said approach corridor;

associating said intruder with a second danger level represented by a second representation on the display screen when said intruder is going to be ahead of the aircraft when it enters into said approach corridor; and associating said intruder with a third danger level representative by a third representation on the display screen when said intruder is ahead of the aircraft in said approach corridor at the current instant.

13. A method according to claim 1, wherein the following steps are performed:

displaying a moving box on the display screen, the moving box representing a quadrilateral of predetermined fixed width and of length equal to the product of the ground speed of the aircraft multiplied by a time constant, the moving box being centered transversely on the speed vector of the aircraft and extending longitudinally from a representation of the aircraft;

determining over time the current positions together with the travel directions, the travel speeds, and the predicted locations at the end of said time constant of entities referred to as "near elements" that are situated on said liquid surface and that are provided with respective automatic identification systems, said entities being present in a predetermined scan zone centered on said aircraft; and for each near element displaying the following on the display screen:

a first symbology when the current position and the predicted location are not situated in the moving box;

a second symbology when the current position is not situated in the moving box and when the predicted location is situated in the moving box;

a third symbology when the current position is situated in the moving box and when the predicted location is not situated in the moving box; and a fourth symbology when the current position and the predicted location are both situated in the moving box.

* * * * *